(12) United States Patent
Shen et al.

(10) Patent No.: US 7,027,897 B2
(45) Date of Patent: Apr. 11, 2006

(54) APPARATUS AND METHOD FOR SUPPRESSING MECHANICAL RESONANCE IN A MASS TRANSIT VEHICLE

(75) Inventors: Jian Shen, Upper Saint Clair, PA (US); Fred S. Marton, Export, PA (US); Linda F. Clawson, Monroeville, PA (US); Kenneth A. Karg, Belle Vernon, PA (US)

(73) Assignee: Bombardier Transportation GmbH, Berlin (DE)

( * ) Notice: Subject to any disclaimer, the term of this patent is extended or adjusted under 35 U.S.C. 154(b) by 204 days.

(21) Appl. No.: 10/765,251

(22) Filed: Jan. 27, 2004

(65) Prior Publication Data

US 2005/0164711 A1    Jul. 28, 2005

(51) Int. Cl.
G06F 7/00 (2006.01)
B60G 13/00 (2006.01)

(52) U.S. Cl. .............. 701/1; 701/19; 701/20; 246/2 R; 246/34 R; 246/61; 104/165; 280/124.108

(58) Field of Classification Search .......... 701/1, 701/19, 20; 104/165; 246/2 R, 34 R, 61; 280/124.108
See application file for complete search history.

(56) References Cited

U.S. PATENT DOCUMENTS

| | | | |
|---|---|---|---|
| 3,609,350 A | 9/1971 | Wilson et al. | |
| 4,074,879 A * | 2/1978 | Clark et al. | 246/37 |
| 4,352,475 A | 10/1982 | Smith et al. | |
| 4,488,238 A | 12/1984 | Salmon et al. | |
| 4,878,638 A * | 11/1989 | Hoelscher et al. | 246/34 CT |
| 5,345,358 A | 9/1994 | Kumar | |
| 5,613,009 A | 3/1997 | Miyazaki et al. | |
| 5,629,986 A | 5/1997 | Shoureshi | |
| 5,638,305 A | 6/1997 | Kobayashi et al. | |
| 5,721,681 A | 2/1998 | Borschert et al. | |
| 5,820,081 A | 10/1998 | Haass | |
| 5,960,969 A | 10/1999 | Habisohn | |
| 5,990,645 A | 11/1999 | Nakamura et al. | |
| 6,031,790 A | 2/2000 | Futsuhara et al. | |
| 6,102,221 A | 8/2000 | Habisohn | |
| 6,182,001 B1 | 1/2001 | Sugai et al. | |
| 6,186,485 B1 | 2/2001 | Kawazoe | |
| 6,255,962 B1 | 7/2001 | Tanenhaus et al. | |
| 6,292,432 B1 | 9/2001 | Futsuhara et al. | |
| 6,296,093 B1 | 10/2001 | Norris et al. | |
| 6,411,080 B1 | 6/2002 | Bach et al. | |
| 6,441,506 B1 | 8/2002 | Nakashima | |
| 2002/0030497 A1 | 3/2002 | Uehira et al. | |
| 2002/0115197 A1 | 8/2002 | Ochi et al. | |

* cited by examiner

FOREIGN PATENT DOCUMENTS

JP    61-116903 A    6/1986

*Primary Examiner*—Yonel Beaulieu
(74) *Attorney, Agent, or Firm*—The Webb Law Firm

(57) ABSTRACT

A mass transit vehicle traction motor control system includes an automatic control block for receiving and processing a tachometer signal having a first resonance signal superimposed thereon to produce a rate request signal having a corresponding second resonance signal superimposed thereon. A filter is provided for decreasing an amplitude of the second resonance signal whereupon the rate request signal is isolated therefrom. A communication and control block and a propulsion and control block co-act to process the isolated rate request signal to produce a speed control signal that is configured to cause a traction motor of a mass transit vehicle to provide motive force to the mass transit vehicle at a rate related to the value of the speed control signal.

32 Claims, 3 Drawing Sheets

US 7,027,897 B2

APPARATUS AND METHOD FOR SUPPRESSING MECHANICAL RESONANCE IN A MASS TRANSIT VEHICLE

BACKGROUND OF THE INVENTION

1. Field of the Invention

The present invention relates to avoiding or eliminating undesirable resonance induced in a mass transit vehicle by operation of a propulsion system of the vehicle.

2. Description of Related Art

Vibration created by the mechanical resonance of a mechanical system vibrating at a natural or resonant frequency is well known. In a mass transit vehicle, such as an electrically propelled steel wheeled rail vehicle or rubber wheeled vehicle, mechanical resonance can result from interaction between the electrical and mechanical systems of the vehicle during operation of the vehicle. Failure to control the resonance created by these systems can result in the transmission of vibration throughout the vehicle resulting in an uncomfortable ride for a passenger and a reduction in the life-span of the vehicle's drive system.

Systems for canceling vibrations created by mechanical resonance at a natural frequency have been proposed in which the vibration is sensed via an appropriate pick-up and a cancellation signal is created which is a 180 degrees out-of-phase with the sensed signal. The cancellation signal is applied to or near the vibration source thereby canceling, or at least greatly attenuating, the vibration source. U.S. patents disclosing such systems are U.S. Pat. Nos. 4,153, 815; 4,417,098; 4,489,441; and 4,566,118. Such systems are based on adaptive signal processing techniques which may result in an inherent instability which could amplify rather than attenuate the vibration. Also, such systems require direct measurement of a synchronizing signal which provides them directly with the value of the frequency of the excitation source (vibration). These systems operate on the basis of synthesizing the vibration source signal, synchronizing it with the excitation signal, then delaying such signal to achieve a 180 degree phase difference and applying it to cancel the effect of the excitation source. This results in a high sensitivity and potentially unstable vibration cancellation due to exact phasing needs.

Another system involves sending a natural frequency vibration to a band-pass filter or through software, which then outputs an appropriate signal to mechanical actuators configured to act upon the outside forces causing the vibration thereby reducing the extent of the offending vibration. This system is disclosed in U.S. Pat. No. 6,186,485 to Kawazoe wherein a reference signal indicative of a vibrating condition of a vehicle's body and a residual vibration signal indicative of a residual vibration of the vehicle's mounting body are generated. A low-pass filter then generates a driving signal according to the reference signal and the residual vibration signal. This driving signal is output to an actuator in order to reduce vibration transmitted from the vehicle's vibrating body to the vehicle's mounting body. The drawback to such a system is that it relies on a mechanical apparatus to attenuate the resonance.

The aforementioned systems operate on the principle of providing resonance attenuation external to the control loop of a system. In systems where resonance remains within the control loop, such as a rail vehicle control loop, the mechanical resonance leads to a noticeable vibration resulting in an uncomfortable ride for a passenger and a reduction in the life-span of the vehicle's drive system components. Accordingly, what is needed and has not heretofore been developed is a method and apparatus for damping mechanical and electrical resonance as it occurs within the control loop of the system.

SUMMARY OF THE INVENTION

The invention is a mass transit vehicle that includes a traction motor responsive to a speed control signal for imparting motive force to the mass transit vehicle and a tachometer responsive to an angular velocity of the traction motor for outputting a tachometer signal indicative thereof. A control system is provided that is responsive to the tachometer signal for outputting a rate request signal. The control system includes a filter for isolating the rate request signal from a resonance signal superimposed thereon as a function of a corresponding resonance signal superimposed on the tachometer signal wherein the speed control signal is responsive to the isolated rate request signal.

The invention is also a mass transit vehicle that includes a traction motor responsive to a speed control signal for imparting motive force to the mass transit vehicle and a tachometer responsive to an angular velocity of the traction motor for outputting a tachometer signal indicative thereof. A control system is provided that is responsive to the tachometer signal for outputting a rate request signal. The rate request signal and the speed control signal each have a resonance signal superimposed thereon as a function of a corresponding resonance signal superimposed on the tachometer signal. The control system includes a filter for isolating the resonance signal superimposed on the speed control signal from the speed control signal. The control system is responsive to the combination of the isolated resonance signal, the rate request signal and the resonance signal superimposed thereon for isolating the rate request signal from the resonance signal superimposed thereon and for outputting the speed control signal as a function of the isolated rate request signal.

The invention is also a mass transit vehicle traction motor controller that includes a tachometer that is responsive to an angular velocity of the traction motor for outputting a tachometer signal indicative thereof. The tachometer signal has superimposed thereon a resonance signal produced in response to mechanical structure of the mass transit vehicle resonating at its natural frequency in response to the traction motor providing motive force to the mechanical structure. The controller also includes a control system responsive to receiving the tachometer signal at an input end thereof for outputting from an output end thereof as a function of the tachometer signal a speed control signal that controls the angular velocity of the traction motor. The control system includes a filter in a feed forward signal path between the input and the output for reducing the effect of the resonance signal on the speed control signal.

The invention is also a mass transit vehicle traction motor control system that includes a tachometer that is responsive to an angular velocity of the traction motor for outputting a tachometer signal indicative thereof. The tachometer signal has superimposed thereon a first resonance signal produced in response to a mechanical structure of the mass transit vehicle resonating at its natural frequency in response to the traction motor providing motive force to the mechanical structure. The controller also includes a control system responsive to the tachometer signal for outputting, as a function thereof, a speed control signal that controls the angular velocity of the traction motor. The speed control signal initially has a second resonance signal superimposed thereon that corresponds to the first resonance signal. The control system includes a filter in a feedback signal path for isolating the second resonance signal from the speed control signal. The control system is (i) responsive to the tachometer signal and the first resonance signal for outputting a rate request signal having superimposed thereon a third resonance signal that corresponds to the first resonance signal, (ii) responsive to the combination of the isolated second resonance signal, the rate request signal and the third resonance signal for isolating the rate request signal from said combination and (iii) responsive to the isolated speed request for outputting the speed control signal absent the second resonance signal.

The invention is also a method of controlling a traction motor of a mass transit vehicle that includes the steps of: (a) receiving a tachometer signal having a first resonance signal superimposed thereon; (b) processing the tachometer signal and the first resonance signal to produce a rate request signal having a second resonance signal superimposed thereon; (c) decreasing an amplitude of the second resonance signal whereupon the rate request signal is isolated therefrom; and (d) processing the isolated rate request signal to produce a speed control signal that is configured to cause a traction motor of a mass transit vehicle to provide motive force to the mass transit vehicle at a rate related to a value of the speed control signal.

Lastly, the invention is a system for controlling a traction motor of a mass transit vehicle. The system includes means for receiving a tachometer signal having a first resonance signal superimposed thereon; means for processing the tachometer signal and the first resonance signal to produce a rate request signal having a second resonance signal superimposed thereon; means for decreasing an amplitude of the second resonance signal whereupon the rate request signal is isolated therefrom; and means for processing the isolated rate request signal to produce a speed control signal that is configured to cause a traction motor of the mass transit vehicle to provide motive force to the mass transit vehicle at a rate related to a value of the speed control signal.

DETAILED DESCRIPTION OF THE INVENTION

Figure 1:
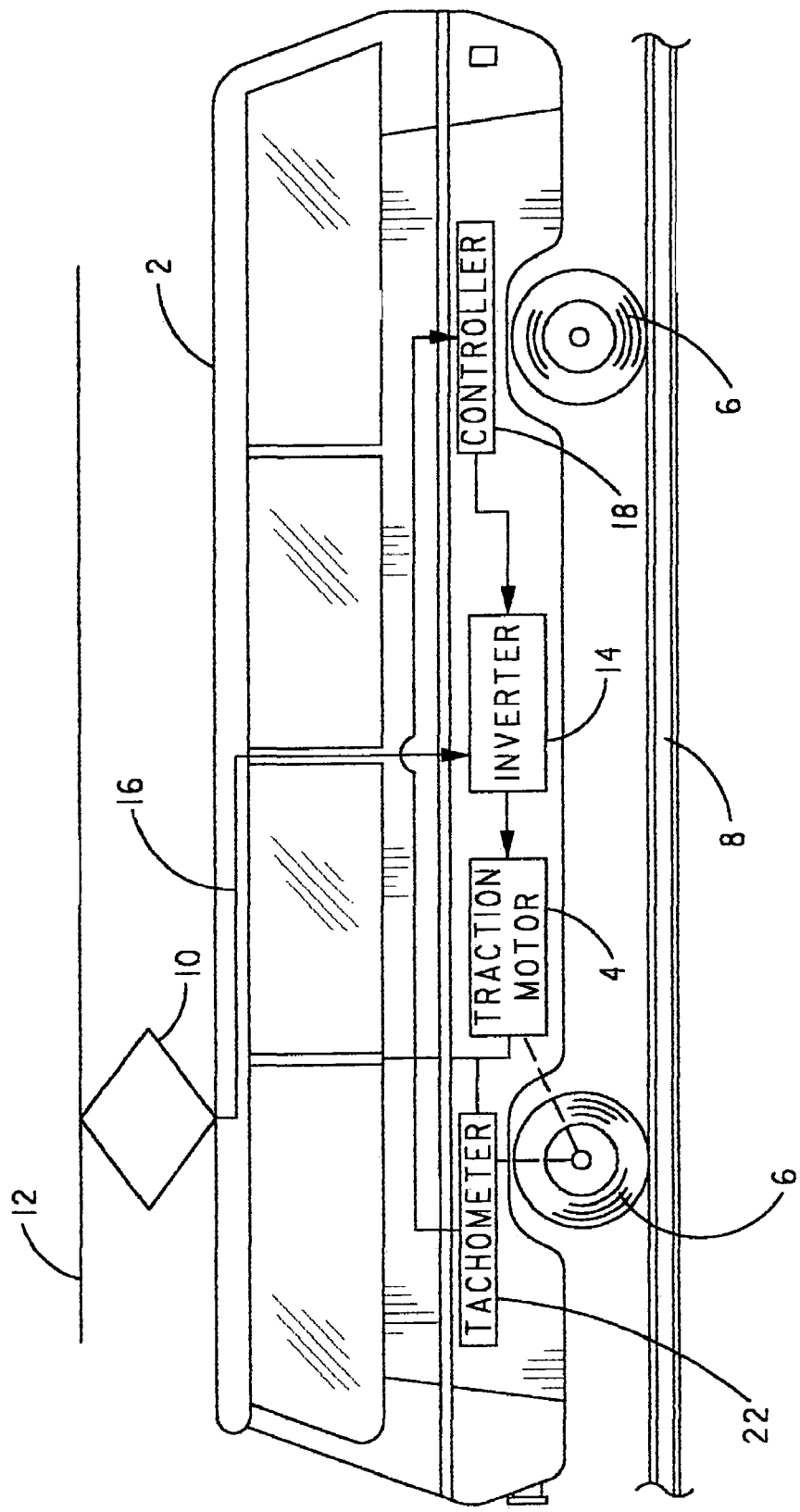
FIG. 1 is a side view of an electrically powered mass transit vehicle including a propulsion and control system in block diagram.

With reference to FIG. 1, an electric powered mass transit vehicle 2 includes a traction motor 4 for providing motive force to one or more wheels 6 to propel vehicle 2 along a path 8, such as one or more running rails for a steel wheeled vehicle or a guideway for a rubber wheeled vehicle. In the illustrated embodiment, vehicle 2 includes a power collector 10 that is utilized to conduct electrical power from an external supply line 12 to the vehicle 2. Electric power conducted by power collector 10 is supplied to an inverter 14 via an internal supply line 16. Under the control of a controller 18, inverter 14 can convert the incoming electrical power into electrical power that is useable by traction motor 4. Traction motor 4 converts the electrical power provided thereto into motive force of sufficient extent to propel vehicle 2 along path 8. Alternatively, vehicle 2 can include an internal source of electrical power (not shown) that supplies electric power to traction motor 4 via inverter 14 under the control of controller 18. If vehicle 2 includes an internal source of electric power, power collector 10, supply lines 12 and 16 would be omitted from the embodiment shown in FIG. 1. The description herein of inverter 14 supplying electric power, i.e., AC electric power, to traction motor 4, i.e., an AC traction motor, is not to be construed as limiting the invention since inverter 14 can be replaced with a suitable control means (not shown) for controllably supplying DC electric power to a DC traction motor of vehicle 2 from a suitable internal or external source of electric power.

Figure 2:
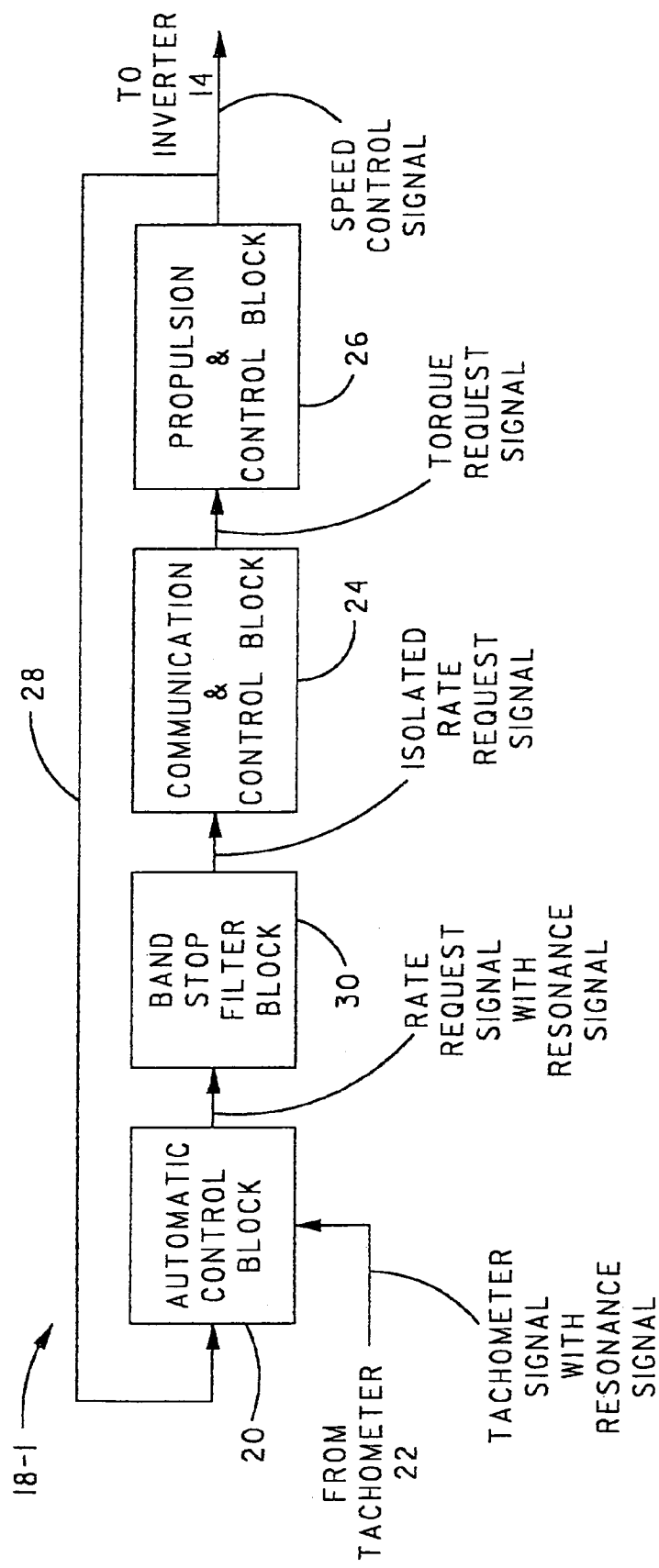
FIG. 2 is a block diagram of a first embodiment of a controller of the propulsion and control system shown in FIG. 1.

With reference to FIG. 2, and with ongoing reference to FIG. 1, a first embodiment of a controller 18-1 includes an automatic control block 20 that includes a computer, such as a microprocessor, operating under the control of a control program for controlling the movement of vehicle 2 along path 8. Specifically, operating under the control of the control program, automatic control block 20 controls all aspects of the movement of vehicle 2 along path 8. These aspects can include, among other things, the acceleration, deceleration and velocity of vehicle 2 along with the stopping locations of vehicle 2 along path 8, the duration of each stop, and the like as needed for the safe and effective transport of vehicle 2 along path 8. Where vehicle 2 is attendantless, the foregoing control aspects are completely under the control of automatic control block 20 operating under the control of the control program. Where vehicle 2 includes an attendant, one or more of the control aspects can be controlled by the attendant via automatic control block 20 and a suitable attendant interface (not shown).

In order to control the acceleration, deceleration, stopping, starting, and constant velocity operation of vehicle 2, a tachometer 22 is coupled to detect the angular velocity of traction motor 4 during operation and to output a tachometer signal indicative thereof. This tachometer signal is coupled to controller 18-1 and, more specifically, to automatic control block 20 for use thereby in controlling the starting, stopping, acceleration, deceleration and constant velocity operation of vehicle 2.

In operation, automatic control block 20 processes the tachometer signal received from tachometer 22 and, in accordance with its control program, outputs an appropriate rate request signal. Responsive to this rate request signal, a communication and control block 24, having a controller operating under the control of a control program, converts the rate request signal into a torque request signal that is supplied to a propulsion and control block 26.

Propulsion and control block 26 includes a controller operating under the control of a control program for converting the torque request signal into a speed control signal that is supplied to inverter 14. This speed control signal causes inverter 14 to supply electric power to traction motor 4 at a rate determined by a value of the speed control signal. The operation of blocks 20, 24 and 26 are well known in the art and will not be described in detail herein for simplicity of description.

If desired, a feedback path 28 can supply the speed control signal to automatic control block 20 for use in controlling the value of the speed control signal and, thereby, the velocity and/or acceleration of vehicle 2.

In accordance with the present invention, controller 18-1 includes a band stop filter block 30 in a feed forward signal path that includes automatic control block 20, communication and control block 24 and propulsion and control block 26. The need for and operation of band stop filter block 30 will now be described.

When traction motor 4 is an alternating current traction motor, and inverter 14 is supplying pulsed DC power to traction motor 4 during operation of vehicle 2, the mechanical structure of vehicle 2 can commence resonating at its natural frequency.

This initial mechanical resonance can be converted by tachometer 22 into a resonance signal that is superimposed on the tachometer signal. Absent band stop filter block 30 in the feed forward signal path of controller 18-1, the resonance signal superimposed on the tachometer signal can, in-turn, cause related resonance signals to be superimposed on the signals output by each block 20, 24, and 26 whereupon the speed control signal output by propulsion and control block 26 includes a resonance signal superimposed thereon that is related to the resonance signal superimposed on the tachometer signal. The resonance signal superimposed on the speed control signal causes inverter 14 to supply traction motor 4 with electrical power including a resonance signal component. Traction motor 4 and the mechanical structure of vehicle 2 convert this electrical resonance component into an electrically induced mechanical resonance that can act to maintain or intensify, the initial mechanical resonance of the mechanical structure of vehicle 2 caused by traction motor 4 driving vehicle 2.

Blocks 20, 24 and 26 do not have a sufficient response time to avoid or eliminate the initial mechanical resonance and/or any electrically induced mechanical resonance. Specifically, electronic components of blocks 20, 24 and 26 introduce a time delay between the time a signal is received and a time a response signal is output. The sum of these delays equals a loop delay time. It has been observed that the natural frequency of the resonance of the mechanical structure of vehicle 2 is less than l/the loop delay time, i.e., the loop delay frequency. Accordingly, blocks 20, 24 and 26 cannot react quickly enough to avoid or eliminate the initial mechanical resonance or any electrically induced mechanical resonance caused by the operation of blocks 20, 24 and 26 absent band stop filter block 30.

However, the addition of band stop filter block 30 in the feed forward signal path between automatic control block 20 and communication and control block 24 enables the initial mechanical resonance as well as any electrically induced mechanical resonance to be avoided or eliminated. Specifically, in response to receiving the tachometer signal with the resonance signal superimposed thereon, automatic control block 20 processes the tachometer signal and the resonance signal and outputs a rate request signal having a resonance signal superimposed thereon that is related to the resonance signal superimposed oil the tachometer signal. The signals output by automatic control block 20 are received by band stop filter block 30 which is configured to band stop filter the frequency of the resonance signal or a band of continuous frequencies that includes the resonant frequency of the resonance signal and to output an isolated rate request signal, i.e., the rate request signal absent the resonance signal superimposed thereon. More specifically, band stop filter block 30 decreases an amplitude of the resonance signal sufficiently whereupon the effect on traction motor 4 of the resonance of the mechanical structure of vehicle 2 at its natural frequency is avoided or eliminated.

In the event any resonance signal remnant remains superimposed on the rate request signal output by band stop filter block 30 and, hence, on the speed control signal output by propulsion and control block 26, feedback path 28 can be provided for returning the speed control signal having the resonance signal remnant superimposed thereon back to automatic control block 20. In response to receiving this resonance signal remnant, automatic control block 20 can superimpose it on the rate request signal. Band stop filter block 30 can then filter this resonance signal remnant, along with the resonance signal superimposed on the rate request signal and output the isolated rate request signal to communication and control block 24.

Figure 3:
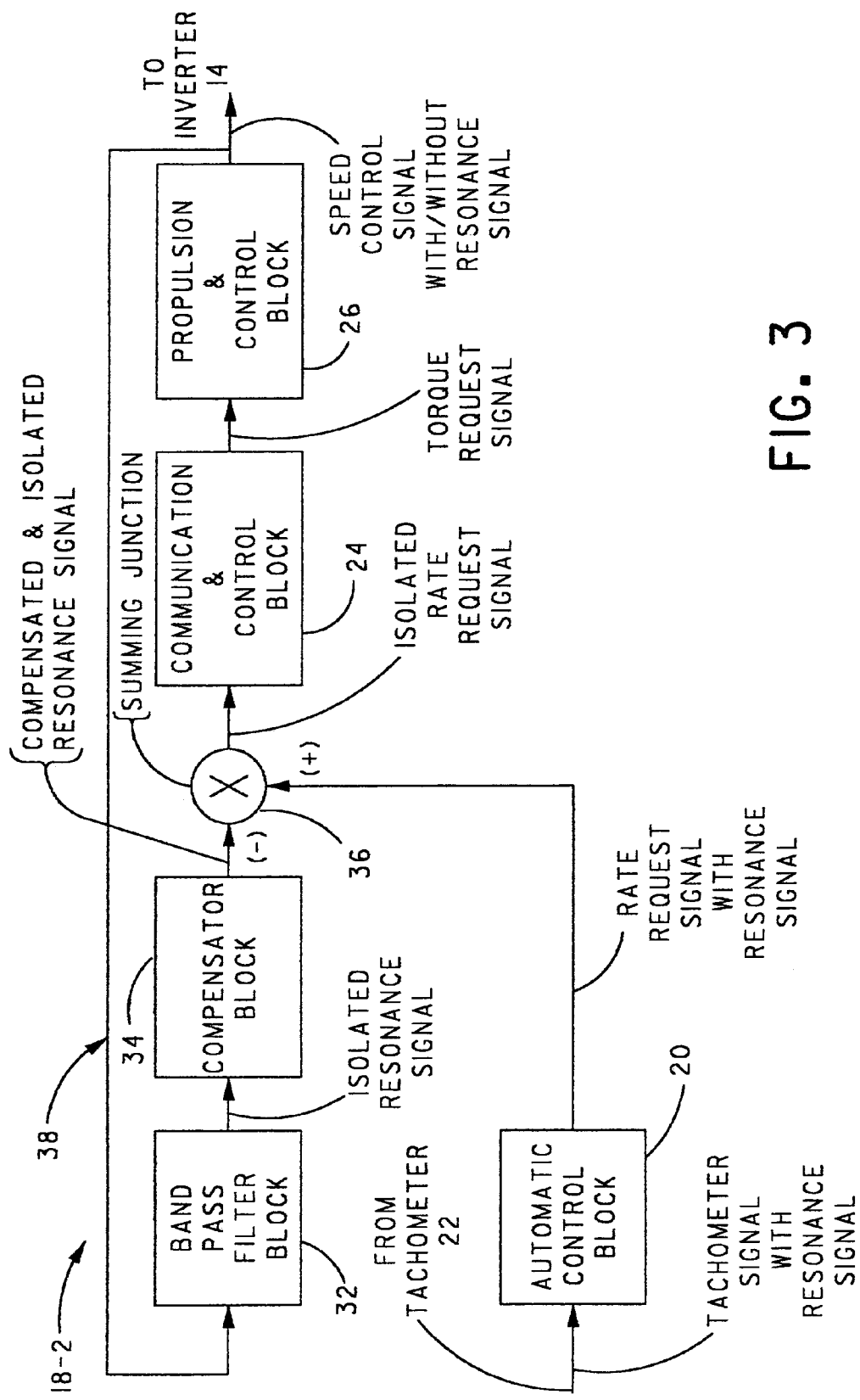
FIG. 3 is a block diagram of a second embodiment of a controller of the propulsion and control system shown in FIG. 1.

With reference to FIG. 3, and with continuing reference to FIGS. 1 and 2, a second embodiment of a controller 18-2 includes automatic control block 20, communication and control block 24 and propulsion and control block 26 similar to those described above in connection with controller 18-1 shown in FIG. 2. However, band stop filter block 30 and feedback path 28 in controller 18-1 are eliminated and replaced in controller 18-2 with a band pass filter block 32, a compensator block 34 coupled to an output of band pass filter block 32 and a summing junction block 36 which has an inverting input coupled to an output of compensator 34 and a non-inverting input coupled to an output of automatic control block 20. An output of propulsion and control block 26 is also connected to an input of band pass filter block 32 via a feedback path 38. Feedback path 38, band pass filter block 32 and compensator block 34 define a feedback signal path of controller 18-2.

Prior to the mechanical structure of vehicle 2 resonating at its natural frequency in response to traction motor 4 providing motive force thereto, a resonance signal is not superimposed on each of the tachometer signal, the rate request signal and the speed control signal. However, when the mechanical structure of vehicle 2 commences resonating at its natural frequency, a resonance signal is superimposed on the tachometer signal and corresponding resonance signals are superimposed on the rate request signal and the speed control signal output by automatic control block 20 and propulsion and control block 26, respectively. More specifically, when the resonance signal is initially superimposed on the rate request signal output by automatic control block 20, summing junction block 36 passes these signals to communication and control block 24 for processing into the torque request signal which is processed by propulsion and control block 26 into the speed control signal having a related resonance signal superimposed thereon. When the speed control signal having the resonance signal superimposed thereon initially appear at the output of propulsion and control block 26, these signals are supplied via feedback path 38 to the input of band pass filter block 32 which band pass filters these signals and outputs an isolated resonance signal to compensator block 34. Compensator block 34 implements a conventional lead or lag compensator, as needed, of the type well known in the art for processing the isolated resonance signal output by band pass filter block 32 into a compensated and isolated resonance signal which is output to the inverting input of summing junction block 36. Summing junction block 36 combines the compensated and isolated resonance signal output by compensator block 34 with the rate request signal having the resonance signal superimposed thereon output by automatic control block 20. As a result of this combination, the resonance signal superimposed on the rate request signal is canceled by the compensated and isolated resonance signal whereupon summing junction block 36 outputs an isolated rate request signal to communication and control block 24. Communication and control block 24 converts this isolated rate request signal into a torque request signal which is supplied to propulsion and control block 26 for conversion into the speed control signal, now absent the resonance signal.

As can be seen, in controller 18-2, any resonance signal superimposed on the tachometer signal will initially result in a corresponding resonance signal being superimposed on the speed control signal supplied to inverter 14. However, these latter signals are processed by band pass filter block 32 and compensator block 34 to produce the compensated and isolated resonance signal which can be subtractively combined by summing junction block 36 with the resonance signal superimposed on the rate request signal. As a result of this subtractive combination, the resonance signal superimposed on the rate request signal is stripped therefrom, whereupon the isolated speed control signal can be supplied to inverter 14 without the resonance signal being superimposed thereon.

As can be seen, the present invention includes a controller 18-1 having band stop filter block 30 in a feed forward signal path for reducing the effect on the speed control signal of the resonance signal superimposed on the tachometer signal. Moreover, the present invention also includes a controller 18-2 that includes band pass filter block 30, compensator block 34 and feedback path 38 defining a feedback signal path for reducing the effect on the speed control signal of a resonance signal superimposed on the tachometer signal.

The present invention has been described with reference to the preferred embodiments. Obvious modifications and alterations will occur to others upon reading and understanding the preceding detailed description. For example, the description of blocks 20, 24 and 26 as being controllers operating under the control of a software program is not to be construed as limiting the invention since any or all of these blocks can be implemented in any combination of digital and/or analog hardware that enables the block to perform its function. Moreover, the description of the various blocks of controllers 18-1 and 18-2 as being separate and apart from each other block is not to be construed as limiting the invention since multiple blocks can be implemented in any desirable manner to achieve the desired functions. It is intended that the invention be construed as including all such modifications and alterations insofar as they come within the scope of the appended claims or the equivalents thereof.

The invention claimed is:

1. A mass transit vehicle comprising:
   a traction motor responsive to a first signal;
   a velocity detection device for outputting a second signal; and
   a control system responsive to said second signal for generating a third signal and outputting said first signal, the control system including a filter for isolating a carrying signal from a resonance signal superimposed thereon, said resonance signal corresponding to a resonance signal superimposed on said second signal.

2. The mass transit vehicle of claim 1, wherein:
   said carrying signal is said third signal; and
   said filter outputs the isolated third signal.

3. The mass transit vehicle of claim 2, wherein said control system includes an automatic control block operating under the control of a control program for outputting said third signal as a function of said second signal and said first signal.

4. The mass transit vehicle of claim 3, wherein said control system further includes:
   a communication and control block responsive to said isolated third signal for outputting a fourth signal; and
   a propulsion and control block responsive to said fourth signal for outputting said first signal.

5. The mass transit vehicle of claim 4, wherein:
   said automatic control block, said communication and control block, and said propulsion and control block each introduce a time delay between the time a signal is received thereby and the time a responsive signal is output thereby;
   the sum of delays equals a loop delay time;
   one divided by the loop delay time (1/loop delay time) equals a loop delay frequency; and
   said filter filters at least said loop delay frequency.

6. The mass transit vehicle of claim 5, wherein:
   said first signal is a speed control signal and said third signal is a rate request signal;
   said velocity detection device is a tachometer and said second signal is a tachometer signal; and
   said tachometer is responsive to an angular velocity of said traction motor for outputting said tachometer signal indicative thereof.

7. The mass transit vehicle of claim 1, wherein:
   said carrying signal is said first signal; and
   said filter outputs the isolated resonance signal.

8. The mass transit vehicle of claim 7, wherein said control system includes an automatic control block operating under the control of a control program for outputting said third signal as a function of said second signal.

9. The mass transit vehicle of claim 7, wherein said control system includes a compensator block for processing said isolated resonance signal and outputting a compensated isolated resonance signal.

10. The mass transit vehicle of claim 9, wherein said control system further includes a summing junction block operative to combine said compensated isolated resonance signal and said third signal, said summing junction outputting an isolated third signal.

11. The mass transit vehicle of claim 10, wherein said control system further includes:
    a communication and control block responsive to said isolated third signal for outputting a fourth signal; and
    a propulsion and control block responsive to said fourth signal for outputting said first signal.

12. The mass transit vehicle of claim 11, wherein:
    said automatic control block, said communication and control block, and said propulsion and control block each introduce a time delay between the time a signal is received thereby and the time a responsive signal is output thereby;
    the sum of delays equals a loop delay time;
    one divided by the loop delay time (1/loop delay time) equals a loop delay frequency; and
    said filter filters at least said loop delay frequency.

13. The mass transit vehicle of claim 12, wherein:
    said first signal is a speed control signal and said third signal is a rate request signal;
    said velocity detection device is a tachometer and said second signal is a tachometer signal; and
    said tachometer is responsive to an angular velocity of said traction motor for outputting said tachometer signal indicative thereof.

14. A mass transit vehicle traction motor controller comprising:
    a traction motor responsive to a speed control signal;
    a tachometer responsive to an angular velocity of said traction motor for outputting a tachometer signal; and
    a control system responsive to said tachometer signal for generating a rate request signal and outputting said speed control signal, the control system including a filter for isolating a carrying signal from a resonance signal superimposed thereon, said resonance signal corresponding to a resonance signal superimposed on said tachometer signal.

15. The controller of claim 14, wherein:
said carrying signal is said rate request signal; and
said filter outputs the isolated rate request signal.

16. The controller of claim 15, wherein said control system includes:
an automatic control block operating under the control of a control program for outputting said rate request signal as a function of said tachometer signal and said speed control signal;
a communication and control block responsive to said isolated rate request signal for outputting an intermediate signal; and
a propulsion and control block responsive to said intermediate signal for outputting said speed control signal.

17. The controller of claim 16, wherein:
said automatic control block, said communication and control block, and said propulsion and control block each introduce a time delay between the time a signal is received thereby and the time a responsive signal is output thereby;
the sum of delays equals a loop delay time;
one divided by the loop delay time (1/loop delay time) equals a loop delay frequency; and
said filter filters at least said loop delay frequency.

18. The controller of claim 17, wherein said filter includes a band stop filter for decreasing the amplitude of said resonance signal.

19. The controller of claim 14, wherein said carrying signal is said speed control signal and wherein said filter output is an isolated resonance signal.

20. The controller of claim 19, wherein said control system includes:
an automatic control block operating under the control of a control program for outputting said rate request signal as a function of said tachometer signal;
a compensator block for processing said isolated resonance signal and outputting a compensated isolated resonance signal;
a summing junction block operative to combine said compensated isolated resonance signal and said rate request signal, said summing junction outputting an isolated rate request signal;
a communication and control block responsive to said isolated rate request signal for outputting an intermediate signal; and
a propulsion and control block responsive to said intermediate signal for outputting said speed control signal.

21. The controller of claim 20, wherein:
said automatic control block, said communication and control block, and said propulsion and control block each introduce a time delay between the time a signal is received thereby and the time a responsive signal is output thereby;
the sum of delays equals a loop delay time;
one divided by the loop delay time (1/loop delay time) equals a loop delay frequency; and
said filter filters at least said loop delay frequency.

22. The controller of claim 20, wherein said filter includes a band pass filter for decreasing the amplitude of said speed control signal.

23. A method of controlling a traction motor of a mass transit vehicle comprising the steps of:
a) receiving a tachometer signal having a resonance signal superimposed thereon;
b) processing said tachometer signal and said resonance signal to produce a rate request signal having said resonance signal superimposed thereon;
c) decreasing an amplitude of said resonance signal thereby producing an isolated rate request signal; and
d) processing said isolated rate request signal to produce a speed control signal that is configured to cause a traction motor of a mass transit vehicle to provide motive force to the mass transit vehicle at a rate related to a value of said speed control signal.

24. The method of claim 23, wherein step (c) includes band stop filtering said rate request signal having said resonance signal superimposed thereon to generate said isolated rate request signal.

25. The method of claim 23, wherein step (b) includes feeding back said speed control signal for processing with said tachometer signal having said resonance signal superimposed thereon to produce said rate request signal having said resonance signal superimposed thereon.

26. The method of claim 23, wherein step (d) includes the steps of:
processing said isolated rate request signal to produce a torque request signal; and
processing said torque request signal to produce said speed control signal.

27. The method of claim 23, wherein step (c) includes:
feeding back said speed control signal having said resonance signal superimposed thereon;
band pass filtering said speed control signal to generate an isolated resonance signal;
processing said isolated resonance signal to produce a compensated isolated resonance signal; and
combining said rate request signal having said resonance signal superimposed thereon with said compensated isolated resonance signal to produce said isolated rate request signal.

28. A system for controlling a traction motor of a mass transit vehicle comprising:
means for receiving a tachometer signal having a resonance signal superimposed thereon;
means for processing said tachometer signal and said resonance signal to produce a rate request signal having said resonance signal superimposed thereon;
means for decreasing an amplitude of said resonance signal thereby producing an isolated rate request signal; and
means for processing said isolated rate request signal to produce a speed control signal that is configured to cause a traction motor of a mass transit vehicle to provide motive force to the mass transit vehicle at a rate related to a value of said speed control signal.

29. The system of claim 28, wherein the means for decreasing the amplitude includes a band stop filter for filtering said rate request signal having said resonance signal superimposed thereon.

30. The system of claim 28, wherein the means for processing the tachometer signal includes means for feeding back said speed control signal for processing with said tachometer signal having said resonance signal superimposed thereon to produce said rate request signal having said resonance signal superimposed thereon.

31. The system of claim 28, wherein the means for processing said isolated rate request signal includes:
    means for processing said isolated rate request signal to produce a torque request signal; and
    means for processing said torque request signal to produce said speed control signal.

32. The system of claim 28, wherein the means for decreasing the amplitude includes:
    means for feeding back said speed control signal having said resonance signal superimposed thereon;
    means for band pass filtering said speed control signal to generate an isolated resonance signal;
    means for processing said isolated resonance signal to produce a compensated isolated resonance signal; and
    means for combining said rate request signal having said resonance signal superimposed thereon with said compensated isolated resonance signal to produce said isolated rate request signal.

* * * * *